United States Patent [19]

Comroe et al.

[11] Patent Number: 5,159,695
[45] Date of Patent: Oct. 27, 1992

[54] COMMUNICATION SYSTEM TO COMMUNICATION SYSTEM COMMUNICATION SYSTEM

[75] Inventors: Richard A. Comroe, Dundee; Arun Sobti, Wheaton; John E. Major, Barrington, all of Ill.

[73] Assignee: Motorola, Inc., Schaumburg, Ill.

[21] Appl. No.: 358,906

[22] Filed: May 30, 1989

[51] Int. Cl.$^5$ ............ H04B 17/02; H04Q 7/02; H04Q 9/00
[52] U.S. Cl. ................ 455/9; 455/15; 455/33.1; 455/53.1; 379/63
[58] Field of Search ............ 455/9, 33, 34, 53, 56, 455/15, 68, 71, 33.1, 33.2, 33.3, 34.1, 53.1, 54.1, 56.1, 14, 20; 379/59, 60, 61; 370/94.1, 94.2, 84, 110.1, 95.1, 95.2, 95.3

[56] References Cited

U.S. PATENT DOCUMENTS

| | | |
|---|---|---|
| 4,534,061 | 8/1985 | Ulug .................... 455/17 |
| 4,578,815 | 3/1986 | Persinotti ............ 455/56 |
| 4,672,601 | 6/1987 | Ablay .................. 455/56 |
| 4,718,108 | 1/1988 | Davidson et al. ... 455/17 |
| 4,737,978 | 4/1988 | Burke et al. ......... 455/33 |
| 4,775,999 | 10/1988 | Williams ............. 455/33 |
| 4,797,947 | 1/1989 | Labedz ................ 455/56 |
| 4,803,726 | 2/1989 | Levine et al. ....... 370/84 |
| 4,807,222 | 2/1989 | Amitay ............... 370/94.1 |

Primary Examiner—Reinhard J. Eisenzopf
Assistant Examiner—Lisa Charouel
Attorney, Agent, or Firm—Steven G. Parmelee; Susan L. Lukasik

[57] ABSTRACT

Independent communication systems are provided with additional receivers that allow the systems to monitor one another's outbound control signalling channels. Secondary control signalling can be interleaved with the primary control signalling information on this communication resource, which secondary control signalling information is intended for reception and use by the monitoring system.

16 Claims, 1 Drawing Sheet

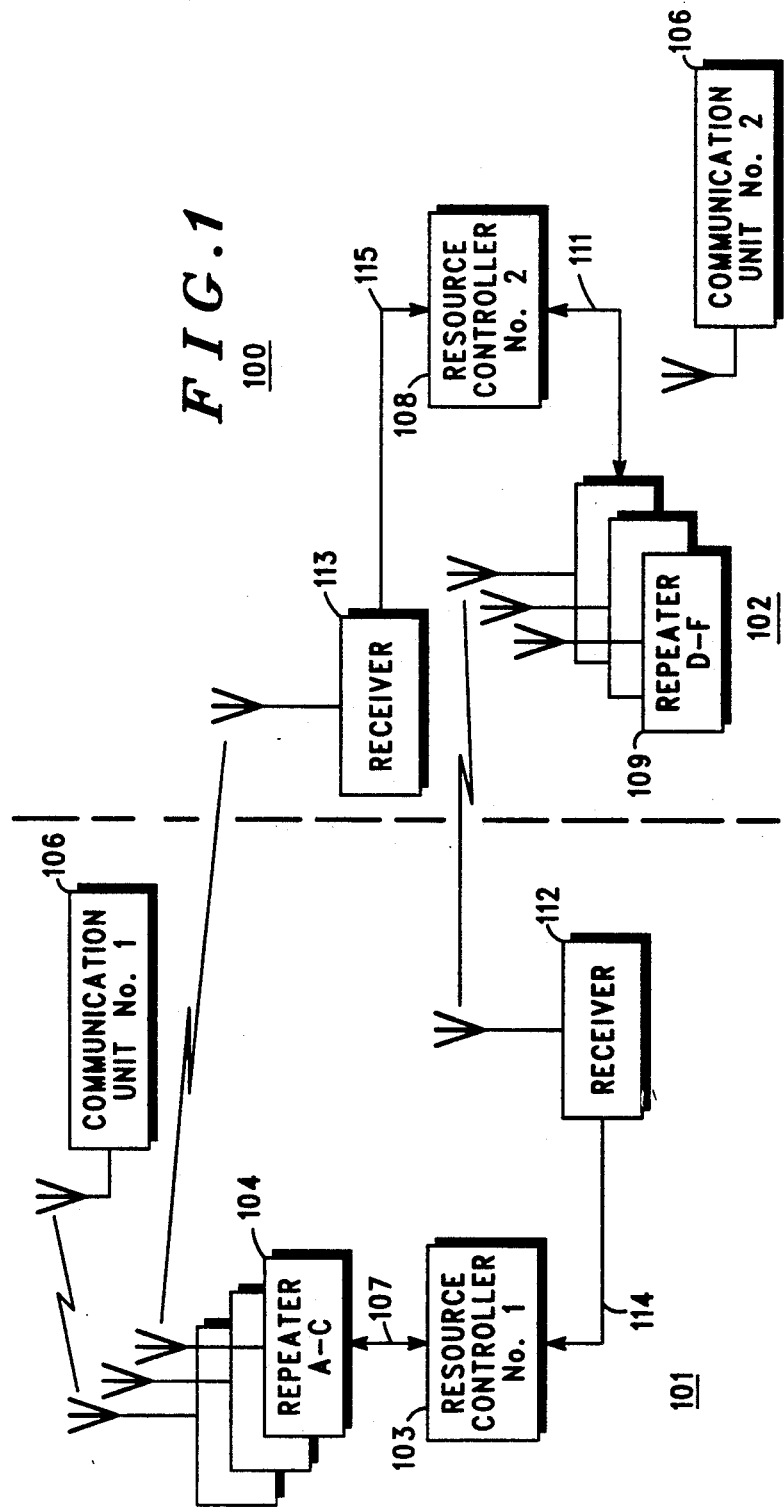

COMMUNICATION SYSTEM TO COMMUNICATION SYSTEM COMMUNICATION SYSTEM

TECHNICAL FIELD

This invention relates generally to communication systems, and more particularly to interlinked trunked communication systems.

BACKGROUND ART

Trunked communication systems are known in the art. In general such systems include a resource controller (which may be centrally located or distributed) that manages communications between communication units (such as fixed location, mobile, and portable two-way radios) on a plurality of communication resources (such as frequency pairs or TDM time slots) that are supported by a plurality of corresponding repeaters.

A number of such systems are available, including the Smartnet and Privacy Plus systems from Motorola, the Clearchannel LTR system from E. F. Johnson, and the Sixteen Plus and Sweet Sixteen systems from General Electric.

In general, such systems tend to operate independent of one another. Therefore, a communication unit located in a first system will generally not be able to communicate with a second communication unit located in a second communication system.

Some prior art systems interlink one or more communication systems through use of an appropriate dedicated landline. So configured, communication units in different communication systems may be able to communicate with one another. Such an approach, however, poses several disadvantages, including increased cost and relative inflexibility.

A need exists for a system and method for economically and flexibly interlinking two or more communication systems.

SUMMARY OF THE INVENTION

This need is substantially met through provision of the intersystem communication system disclosed herein. Pursuant to this invention, each communication system is provided with a receiver that is compatible with the control communication resource, such as a dedicated control channel, of an opposing system. So configured, communications sourced from one system can be received by the other system and properly processed.

In one embodiment, the control communication resource supports both primary control signalling used by member communication units of the communications system to facilitate allocation of the communication resources amongst the member communication units. In addition, this control communication resource also supports secondary control signalling that is intended for and used by a second communication system to facilitate system to system communications.

In another embodiment, the primary control signalling and the secondary control signalling can be transmitted at different data rates, wherein the secondary control signalling is transmitted at a higher data rate.

BRIEF DESCRIPTION OF THE DRAWINGS

FIG. 1 comprises a block diagram depiction of the invention; and

FIG. 2 comprises a timing diagram of the control communication resource.

BEST MODE FOR CARRYING OUT THE INVENTION

Referring to FIG. 1, the invention can be seen as depicted generally by the numeral 100. The system (100) operates in conjunction with other communication systems. For purposes of this description, only two such communication systems (101 and 102) will be described.

The first communication system (101) includes a resource controller (103) that functions to control allocation of a first set of communication resources. In this embodiment, it will be presumed that the communication resources are supported by a plurality of repeaters (104), and that the communication resources themselves comprise a first set of three frequency pairs A-C. In addition, for purposes of this description, it will be presumed that one of the repeaters (104) supports system control information related to resource allocation requests and grants. Such system control information intended for member communication units (106) of that system (101) is referred to herein as primary signalling information. The resource controller (103) controls the repeaters (104) and interchanges resource allocation request and grant information as primary control signalling through the repeaters (104) via an appropriate link (107) as well understood in the art.

A second communication system (102) similarly includes a resource controller (108), repeaters (109) (that support communication resources D-F), and an appropriate link (111) therebetween. In this embodiment, the communication resources A-C of the first system (101) are different from the communication resources D-F of the second system (102). Therefore, the two systems (101 and 102) are not able to communicate directly with one another through the repeaters provided.

Pursuant to this invention, each system (101 and 102) is also provided with a receiver (112 and 113) that is capable of compatibly receiving at least one communication resource of the other system. In this embodiment, the communication resource so received is the control communication resource. Received signalling information is then coupled from the receiver (112 and 113) to the associated resource controller (103 and 108, respectively) via an appropriate link (114 and 115, respectively).

So configured, the resource controllers (103 and 108) are capable of monitoring the control communication resource of the other system.

With reference to FIG. 2, the signalling as supported by the control communication resource of each system (101 and 102) will be described. The outbound primary control signalling uses a slotted Aloha channel access protocol. Typically, outbound primary control signalling words (PCS) (201) are sourced by the resource controller and transmitted by the appropriate control communication resource repeater. These PCS (201) data transmissions are interleaved with appropriate synchronization words (202). Further, a system ID (203) is occasionally transmitted, all as well understood in the art. Pursuant to this invention, the next available data slot (204) following the system ID (203) supports an outbound secondary control signal (SCS) intended for the adjacent communication system. By using the system ID (203) as the marker, the adjacent system can correctly identify and respond as appropriate to the secondary control signalling that has been transmitted by the sourcing system.

Typical outbound primary control signalling words (201) usually contain 76 bits of information, plus an additional 8 bits of frame sync information. In one embodiment of this invention, the secondary control signalling word (204) can utilize a higher bit rate, thereby increasing the data rate by perhaps a factor of 10. For example, the outbound secondary control signal word could hold from 760 to 840 bits of data presuming a transmission rate of about 36K BPS. By using this higher data rate, capacity of the control communication resource will not be substantially impaired. At the same time, the high bit rate will provide satisfactory performance because only fixed site to fixed site communications need be supported.

So configured, a resource controller can source an appropriate secondary control signal intended for reception and processing by another communication system. Such information could be, for example, to establish intersystem communications between communication units (106) as described in the co-pending patent application "Intersystem Communication System and Method", Ser. No. 07/358,730, filed by Sasuta et al. on even date herewith, the contents of which are incorporated herein by this reference.

What is claimed is:

1. In a communication system that supports communications amongst a plurality of member communication units, the communication system having:
   a first set of communication resources that are allocatable amongst the member communication units, wherein at least one of the communication resources supports primary control signalling for use by the member communication units to facilitate allocation of the communication resources amongst the member communication units; and
   a resource controller for allocating the communication resources amongst the member communication units and for sourcing, at least in part, the primary control signalling;
   an improvement wherein:
   A) the at least one of the communication resources also supports secondary control signalling for use by at least one other communication system to facilitate system-to-system communications;
   B) the resource controller sources, at least in part, the secondary control signalling; and
   C) the primary control signalling and secondary control signalling are not directly compatible.

2. The improvement of claim 1 wherein the communication resource that supports the primary control signalling comprises a dedicated control resource.

3. The improvement of claim 2 wherein the dedicated control resource also supports the secondary control signalling.

4. The improvement of claim 3 wherein the primary control signalling includes data transmitted at a first data rate, and the secondary control signalling includes data transmitted at a second data rate, wherein the first data rate is different than the second data rate.

5. The improvement of claim 4 wherein the first data rate is slower than the second data rate.

6. The improvement of claim 4 wherein the dedicated control resource supports a slotted Aloha protocol.

7. The improvement of claim 6 wherein the secondary control signalling is transmitted in an Aloha slot separate from the primary control signalling.

8. The improvement of claim 1 wherein the communication system further includes receiver means for receiving secondary control signalling from at least one other communication system.

9. In a communication system that supports communications amongst a plurality of member communication units, the communication system having:
   a first set of communication resources that are allocatable amongst the member communication units, wherein at least one of the communication resources supports primary control signalling for use by the member communication units to facilitate allocation of the communication resources amongst the member communication units; and
   a resource controller for allocating the communication resources amongst the member communication units and for sourcing, at least in part, the primary control signalling;
   an improvement wherein:
   A) the at least one of the communication resources also supports secondary control signalling for use by at least one other independent communication system to facilitate system-to-system communications;
   B) the resource controller sources, at least in part, the secondary control signalling; and
   C) the primary control signalling and secondary control signalling are not directly compatible.

10. The improvement of claim 9 wherein the communication resource that supports the primary control signalling comprises a dedicated control resource.

11. The improvement of claim 10 wherein the dedicated control resource also supports the secondary control signalling.

12. The improvement of claim 11 wherein the primary control signalling includes data transmitted at a first data rate, and the secondary control signalling includes data transmitted at a second data rate, wherein the first data rate is different than the second data rate.

13. The improvement of claim 12 wherein the first data rate is slower than the second data rate.

14. The improvement of claim 12 wherein the dedicated control resource supports a slotted Aloha protocol.

15. The improvement of claim 13 wherein the secondary control signalling is transmitted in an Aloha slot separate from the primary control signalling.

16. The improvement of claim 9 wherein the communication system further includes receiver means for receiving secondary control signalling from at least one other independent communication system.

* * * * *